(12) United States Patent
Schmidt et al.

(10) Patent No.: US 7,178,501 B2
(45) Date of Patent: Feb. 20, 2007

(54) CRANKSHAFT ASSEMBLY OF AN INTERNAL COMBUSTION ENGINE

(75) Inventors: Roland Schmidt, Korb (DE); Werner Geyer, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 33 days.

(21) Appl. No.: 11/072,343

(22) Filed: Mar. 7, 2005

(65) Prior Publication Data

US 2005/0205043 A1    Sep. 22, 2005

(30) Foreign Application Priority Data

Mar. 20, 2004   (DE) .................. 10 2004 013 870

(51) Int. Cl.
*F16C 3/20* (2006.01)
(52) U.S. Cl. ................................ 123/197.1; 123/197.4
(58) Field of Classification Search ............ 123/197.1, 123/197.4, 192.2
See application file for complete search history.

(56) References Cited

U.S. PATENT DOCUMENTS

| | | | |
|---|---|---|---|
| 4,641,546 A | | 2/1987 | Mettler |
| 4,827,896 A | * | 5/1989 | Adams ...................... 123/53.5 |
| 5,088,345 A | | 2/1992 | Kemmler et al. |
| 5,875,753 A | * | 3/1999 | Ishikawa ................ 123/192.2 |
| 6,283,080 B1 | * | 9/2001 | Tsunoda et al. ......... 123/192.2 |
| 6,293,243 B1 | | 9/2001 | Köder et al. |
| 6,324,942 B1 | * | 12/2001 | Koike et al. .................. 74/603 |
| 6,626,139 B1 | * | 9/2003 | Horita et al. ............ 123/192.2 |
| 6,637,384 B1 | * | 10/2003 | Mendler .................... 123/48 B |
| 6,763,586 B2 | | 7/2004 | Schliemann et al. |
| 6,772,725 B2 | * | 8/2004 | Inaba et al. .............. 123/192.2 |
| 2002/0038644 A1 | * | 4/2002 | Korenjak ................. 123/192.2 |
| 2004/0211384 A1 | * | 10/2004 | Glinsner .................. 123/192.2 |
| 2005/0103305 A1 | * | 5/2005 | Aoyama et al. ......... 123/192.2 |
| 2005/0205043 A1 | * | 9/2005 | Schmidt et al. .......... 123/197.1 |

\* cited by examiner

*Primary Examiner*—Stephen K. Cronin
*Assistant Examiner*—Jason Benton
(74) *Attorney, Agent, or Firm*—Walter Ottesen

(57) ABSTRACT

The invention is directed to a crankshaft (1) of an internal combustion engine including an internal combustion engine for a portable handheld work apparatus such as a motor-driven chain saw or the like. The invention is also directed to a method for making the crankshaft (1) as well as an internal combustion engine with a corresponding crankshaft (1). The crankshaft (1) is made up of separately manufactured parts and includes a crank arm (2) having a central cutout (3) for accommodating a shaft lug (4) of the crankshaft (1) and an eccentric cutout (5) for accommodating a crank pin (6). The crank pin (6) journals a connecting rod (7). A centrifugal mass portion (8) is provided on the crank arm (2) at its end lying opposite the eccentric cutout (5). The centrifugal mass portion (8) is configured as one piece with the crank arm (2) and is bent out of a plane (9) of the crank arm (2) in the direction of the connecting rod (7).

21 Claims, 5 Drawing Sheets

CRANKSHAFT ASSEMBLY OF AN INTERNAL COMBUSTION ENGINE

CROSS REFERENCE TO RELATED APPLICATION

This application claims priority of German patent application no. 10 2004 013 870.2, filed Mar. 20, 2004, the entire content of which is incorporated herein by reference.

1. Field of the Invention

The invention relates to a crankshaft of an internal combustion engine and especially to the crankshaft of an internal combustion engine for a portable handheld work apparatus. The invention also relates to a method for making a crankshaft and to an internal combustion engine equipped with the crankshaft.

2. Background of the Invention

Portable handheld work apparatus such as motor-driven chain saws, brushcutters, suction/blower apparatus or the like must be configured to be light and easily manipulable in order that they can be easily carried and guided. It is intended that an internal combustion engine as a drive motor should, referred to a pregiven piston displacement, exhibit high drive power and a low structural volume with low weight.

The structural size of a corresponding internal combustion engine in the stroke direction of its piston is pregiven by the structural height of the piston, the size of the stroke movement and the required free space for an unhindered rotational movement of the crankshaft. A suitable crankshaft includes at least one crank arm and, as a rule, two crank arms. An eccentrically mounted crank pin for journalling a connecting rod is held between the crank arms. The crank arms are provided with a flywheel or centrifugal mass portion opposite the crank pin. On the one hand, the centrifugal mass portions effect a dynamic mass compensation for the crank pin and the connecting rod and, on the other hand, these centrifugal mass portions function as a centrifugal mass for a uniform running of the engine.

The crank pin lies on the end of the crankshaft facing away from the piston at bottom dead center of the reciprocating piston; whereas, the centrifugal mass portions lie on the crankshaft side facing toward the piston. For a free movability of the crankshaft, at least a minimum distance is required between the lower edge of the piston and the centrifugal mass portions. For this reason, there can be no drop below a certain structural height of the engine.

Internal combustion engines for portable handheld work apparatus are known which are configured as so-called scavenging prestorage engines. One or several air channels are provided in addition to the usual transfer channels for effecting the gas exchange during two-stroke operation. Substantially fuel-free air can be introduced into the corresponding transfer channel by means of the air channels. For controlling the air supply, the piston has piston windows in its piston skirt which clear the air channel or close the same in dependence upon the crankshaft angle. Internal combustion engines of this kind of construction have improved exhaust-gas values. The arrangement of a piston window in the piston skirt, however, increases the structural height of the piston and therefore the overall structural height of the engine. An exchange of existing internal combustion engines of the older type for an internal combustion engine configured to provide scavenging prestorage without changing the rest of the apparatus configuration is difficult in view of the increased structural height.

A reduction of the structural height of the engine utilizing constructive measures on the crank arm is likewise difficult in view of the mass forces which occur there. Especially the crank arms must be configured of light weight for a large rotational moment of inertia. To satisfy this requirement, an especially concentrated arrangement of a centrifugal mass portion with a largest possible rotational radius is required. The rotational radius of the centrifugal mass portions is limited in the direction of the piston because of the required free space.

U.S. Pat. No. 6,763,586 discloses an internal combustion engine of a portable handheld work apparatus having a so-called built-up crankshaft. The crankshaft is assembled from separately manufactured parts. Individually manufactured crank arms are configured as stamped parts with impressed recessed surface sections. During the swaging or impressing operation, the material of the stamped-out semifinished part flows in such a manner that a concentration of mass is introduced over a larger rotational radius in the region of the centrifugal mass portion. For a reduced structural height, the peripheral contour of the centrifugal mass portions reaches up to close to the lower edge of the piston at bottom dead center thereof. To prevent a collision of the centrifugal mass portions with the piston skirt at bottom dead center of the piston, the centrifugal mass portions have a bevel on their outer ends. The bevel, however, reduces the rotational inertia of the crankshaft. The operation of swaging reduces the material selection of the semifinished part for the crank arm. Very high machining forces are required for executing the swaging. Expensive and complex machines and tools are required and the stamping time of the tool can be dissatisfying.

SUMMARY OF THE INVENTION

It is an object of the invention to provide a crankshaft of an internal combustion engine which has good centrifugal mass characteristics while providing a reduced structural space.

The crankshaft assembly of the invention is for an internal combustion engine and includes: a crankshaft having a journal lug; a crank arm having a central cutout for receiving the journal lug therein; a crank pin for journalling a connecting rod of the engine; the crank arm being adjacent the connecting rod and having an eccentric cutout for journalling the crank pin therein; the crank arm defining a plane and having an end portion lying opposite the eccentric cutout; a centrifugal mass at the end portion of the crank arm and formed so as to be an integral part of the crank arm; and, the crank arm being bent so as to cause the centrifugal mass to be bent out of the plane in a direction toward the connecting rod.

It is also an object of the invention to provide a method of making a corresponding crankshaft with reduced complexity and high productivity.

The method of the invention is for making a crankshaft assembly of an internal combustion engine. The method includes the steps of: providing a semifinished piece; precision punching the semifinished piece to produce a blank of the crank arm with the blank including the centrifugal mass formed integrally therewith to form a single piece; and, bending the centrifugal mass out of the plane to form the crank arm.

A further object of the invention is to provide an internal combustion engine of a portable handheld work apparatus which is so improved that a reduced structural height is given in the stroke direction.

The internal combustion engine of the invention includes: a crankshaft assembly; a piston; a connecting rod connected to the piston; a crankshaft having a journal lug; a crank arm having a central cutout for receiving the journal lug therein; a crank pin for journalling the connecting rod; the crank arm being adjacent the connecting rod and having an eccentric cutout for journalling the crank pin therein; the crank arm defining a plane and having an end portion lying opposite the eccentric cutout; a centrifugal mass at the end portion of the crank arm and formed so as to be an integral part of the crank arm; and, the crank arm being bent so as to cause the centrifugal mass to be bent out of the plane in a direction toward the connecting rod.

An internal combustion engine having a piston, connecting rod and a crankshaft is described. The crankshaft is assembled from separately manufactured parts. The crankshaft includes a crank arm having a central cutout for receiving a shaft lug of the crankshaft and with an eccentric cutout for receiving a crank pin which is provided for journalling the connecting rod. A centrifugal mass portion is provided on the crank arm at its end lying opposite the eccentric cutout. The centrifugal mass portion is formed as one piece with the crank arm and is bent over out of a plane of the crank arm in the direction of the connecting arm. The crank arm has an essentially constant thickness in the region of the centrifugal mass portion.

Only a bending over is needed for the spatial configuration of the crank arm. Comparatively low manufacturing forces have to be developed to achieve this bending over. The complexity with respect to machines and tools is low. The tools subjected to reduced loads have a long service life. A high mass portion lies on a comparatively large rotational radius because of the essentially constant thickness of the centrifugal mass portion. Overall, a comparatively small outer diameter of the crank arm can be selected referred to a pregiven required rotational inertial moment. While maintaining a free space between crank arm and piston, there results a low structural height of the engine in the stroke direction of the piston. The bending over of the centrifugal mass portion, which is carried out in the direction of the connecting rod, contributes to the formation of the free space referred to the skirt of the piston.

Imparting a bend to the centrifugal mass portion is advantageously carried out in such a manner that, at bottom dead center of the piston, the piston at least partially lies in overlapment with the centrifugal mass portion referred to the stroke direction of the piston. The piston is configured to be hollow and essentially pot-shaped. The piston overlaps the centrifugal mass portion in its outer component region. The outer component region of the centrifugal mass portion dips into the hollow interior end of the piston. An adequate free space for a free rotatable movement of the crankshaft is ensured by the bend. The overlapping of piston and centrifugal mass portion permits a reduction of the structural height.

Especially in a configuration of the piston having at least one scavenging window in the piston skirt, the increased structural height of the piston, which is caused by the arrangement of the scavenging window, can be compensated by the correspondingly configured crankshaft. The scavenging window is provided, for example, for building a scavenging prestorage engine. Correspondingly configured engines with an at least approximately unchanged structural height can be exchanged for engines of an older type without additional constructive adaptation measures.

The centrifugal mass portion is bent over so far that an outer side of the centrifugal mass portion, which faces away from the connecting rod, lies on the inner side of a bounding region of the piston skirt in the axial direction of the crankshaft. Without increasing the structural height, the piston skirt can be pulled down correspondingly far over the centrifugal mass portion and provides adequate space for the arrangement of additional constructive measures such as a scavenging window or the like in addition to providing a good tilt-free guidance of the piston.

In an advantageous further embodiment, the centrifugal mass portion is bent over pan-shaped along a curved bending line which runs especially in the form of a circular segment. In this way, it is ensured that, in the immediate proximity of bottom dead center, not only the center region of the centrifugal mass portion has an adequate distance to the piston skirt. Indeed, the total peripheral region of the centrifugal mass portion is bent inwardly whereby a corresponding free space results over a widened crankshaft angle range. On the end lying opposite to the piston, the crankcase can have a cutout configured correspondingly small for the rotating centrifugal mass portion. A reduced crankcase housing volume results with a correspondingly high precompression. At the same time, an adequately high axial distance is provided between the crank arms in the region of the crank pin to accommodate a large, robust connecting rod bearing.

A method for making the above-mentioned crankshaft is described wherein a blank of the crank arm is made from a planar semifinished part by precision punching from a planar semifinished piece. In the method, the centrifugal mass portion formed on the blank as an integral part thereof is bent over out of the plane of the blank. The precision punching permits a contour precise shaping of the blank having punched edges which require no further follow-up machining. The subsequent bending process effects only a slight material flow whereby the surface quality of the stamped contour is not affected or only slightly affected. A manufacture can be carried out with minimum complexity at high cycle numbers wherein no follow-up machining is required.

The precision stamping of blanks and the bending of centrifugal mass portions takes place sequentially in a work operation with the same punch. This process is also characterized as finishing punching and permits a cost effective and precise-fit manufacture while avoiding processing at various machining stations.

In an advantageous embodiment of the method, the blank is pressed against a bending swage to bend over the centrifugal mass portion. The peripheral contour of the centrifugal mass is exposed. The exposed peripheral surface can incline unhindered as a consequence of the imparted bending when performing the bending operation. A free bending without additional flow of material and without the application of force associated therewith takes place.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
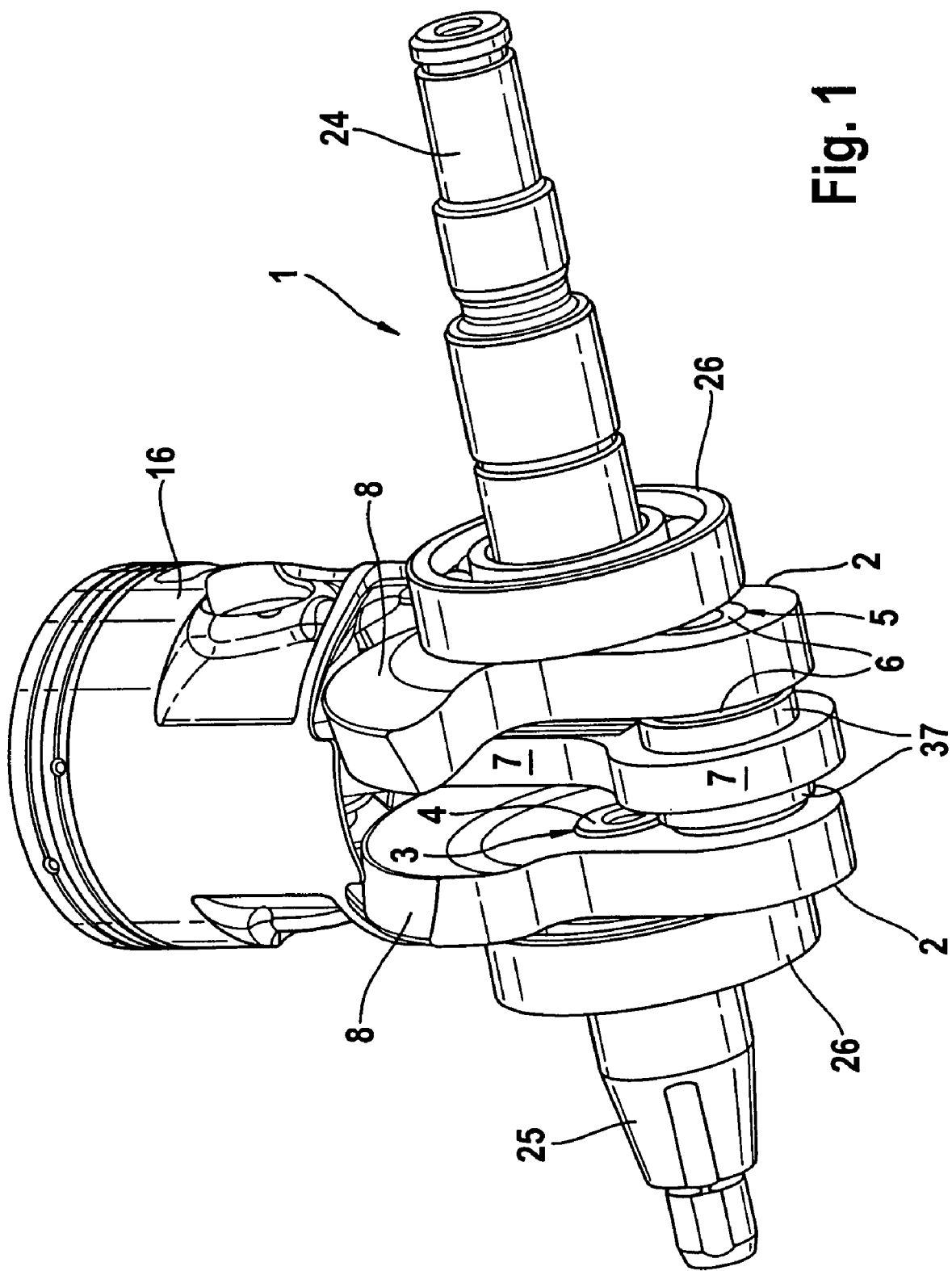
FIG. 1 is a perspective overall view of a crankshaft assembled with a connecting rod and a piston at the bottom dead center thereof.

FIG. 1 shows a perspective view of details of an internal combustion engine for a portable handheld work apparatus. For the sake of clarity, only the region of the crankshaft 1 with a piston 16 and a connecting rod 7 is shown.

The crankshaft 1 is assembled from separately manufactured parts and includes two shaft sections (24, 25) as well as two crank arms 2 bordering on the shaft sections (24, 25). The two crank arms 2 are arranged symmetrically opposite each other and each has a central cutout 3 as well as an eccentric cutout 5. A shaft lug 4 is provided on the mutually adjacent ends of the two shaft sections (24, 25). With the shaft lugs 4, each of the shaft sections (24, 25) is connected in the central cutout 3 of the corresponding crank arm 2 so as to rotate therewith. A crank pin 6 runs through the eccentric cutouts 5 of the two crank arms 2. The connecting rod 7 is journalled on the crank pin 6 by means of a connecting rod bearing 37. At its opposite-lying end, the connecting rod 7 is supported on the piston 16 by means of a piston pin 28 shown in FIG. 3. Each of the crank arms 2 has an end lying opposite the eccentric cutout 5 thereof. A centrifugal mass portion 8 is provided at this end on each of the crank arms 2 and is formed integrally with the crank arm 2. A shaft bearing 26 for journalling the crankshaft 1 is pushed onto corresponding ones of the shaft sections (24, 25). In the embodiment shown, the shaft bearings 26 are configured as ball bearings. A sleeve bearing is provided for the connecting rod support 37.

Figure 2:
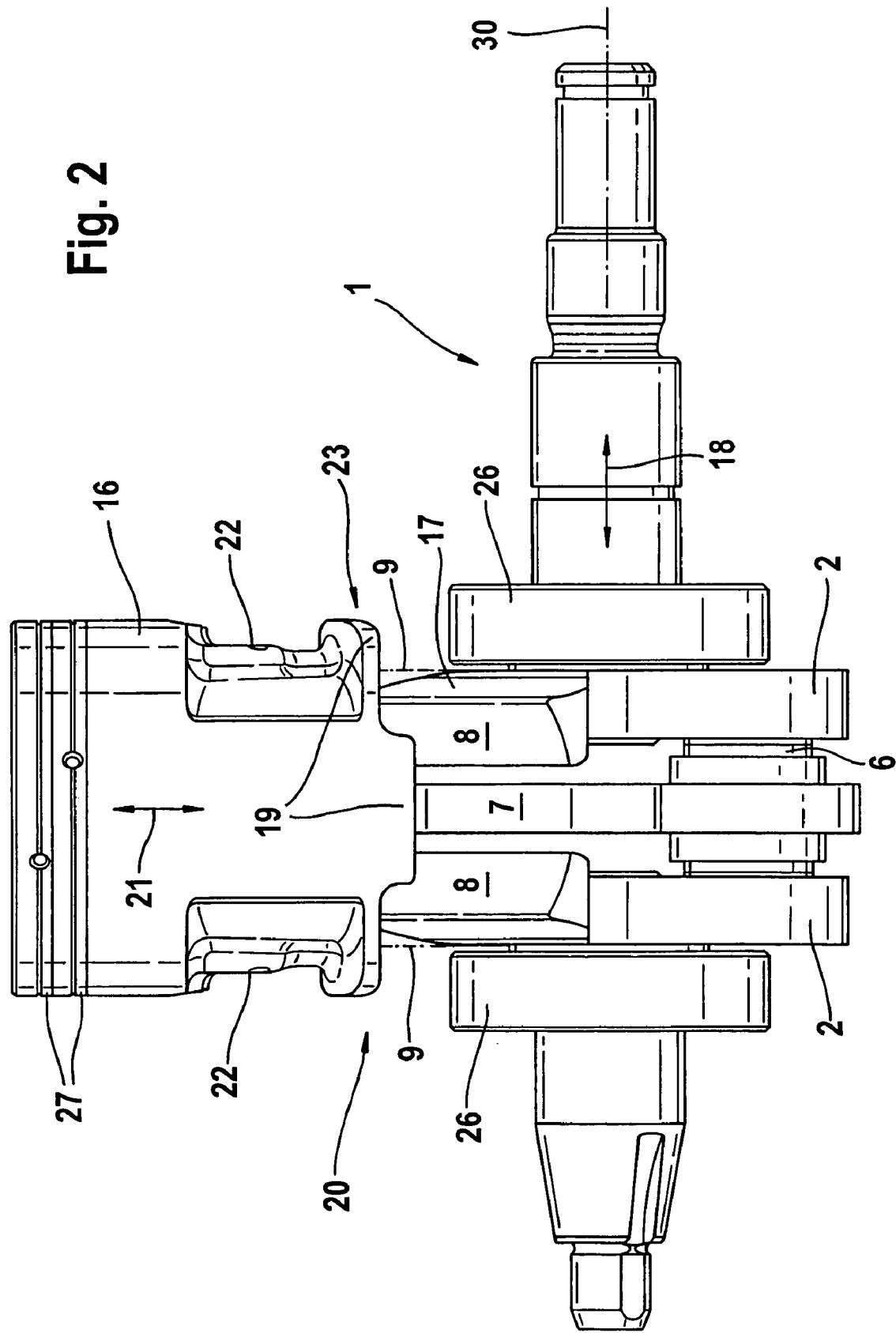
FIG. 2 is a side elevation view of the arrangement of FIG. 1.

FIG. 2 is a side elevation view of the arrangement of FIG. 1 wherein the crankshaft 1 is rotatably journalled about a rotational axis 30 by shaft bearings 26. An axial direction is pregiven by the rotational axis 30 and is indicated by a double arrow 18.

The crankshaft 1 is shown in a rotational position wherein the crank pin 6 lies on the side of the crankshaft 1 lying opposite to the piston 16; whereas, the centrifugal mass portions 8 are positioned on the side facing toward the piston 16. The piston 16 is guided in a stroke direction 21 in a cylinder (not shown). The piston 16 is positioned so close to the crankshaft 1 by means of the crank pin 6 and the connecting rod 7 that the piston 16 has reached bottom dead center 20. With a further rotation of crankshaft 1 about the rotational axis 30, the distance of the piston 16 to the crankshaft 1 increases in the stroke direction 21 until the piston 16 has reached top dead center after a rotation of the crankshaft 1 of 180°.

The crank arms 2 are configured to be essentially planar and define a plane 9 out of which the centrifugal mass portion 8 is bent in the direction of the connecting rod 7.

Below the two piston rings 27, the piston 16 has a peripherally-extending piston skirt 19 in which scavenging windows 22 are formed laterally in the axial direction 18. At bottom dead center 20 of the piston 16 shown, the piston 16 lies at least partially in overlapment with the two centrifugal mass portions 8 referred to the stroke direction 21 of the piston. The two centrifugal mass portions 8 are bent over so far in the direction of the connecting rod 7 that their two outer ends 17, which face away from the connecting rod 7, lie on the inner side of the adjacent region 23 of the piston skirt 19 referred to the axial direction 18. The two centrifugal mass portions 8 project in the stroke direction 21 so far into the hollow inner space of the piston 16 that the radially outer-lying region of the centrifugal mass portions 8 is completely surrounded by the piston skirt 19.

Figure 3:
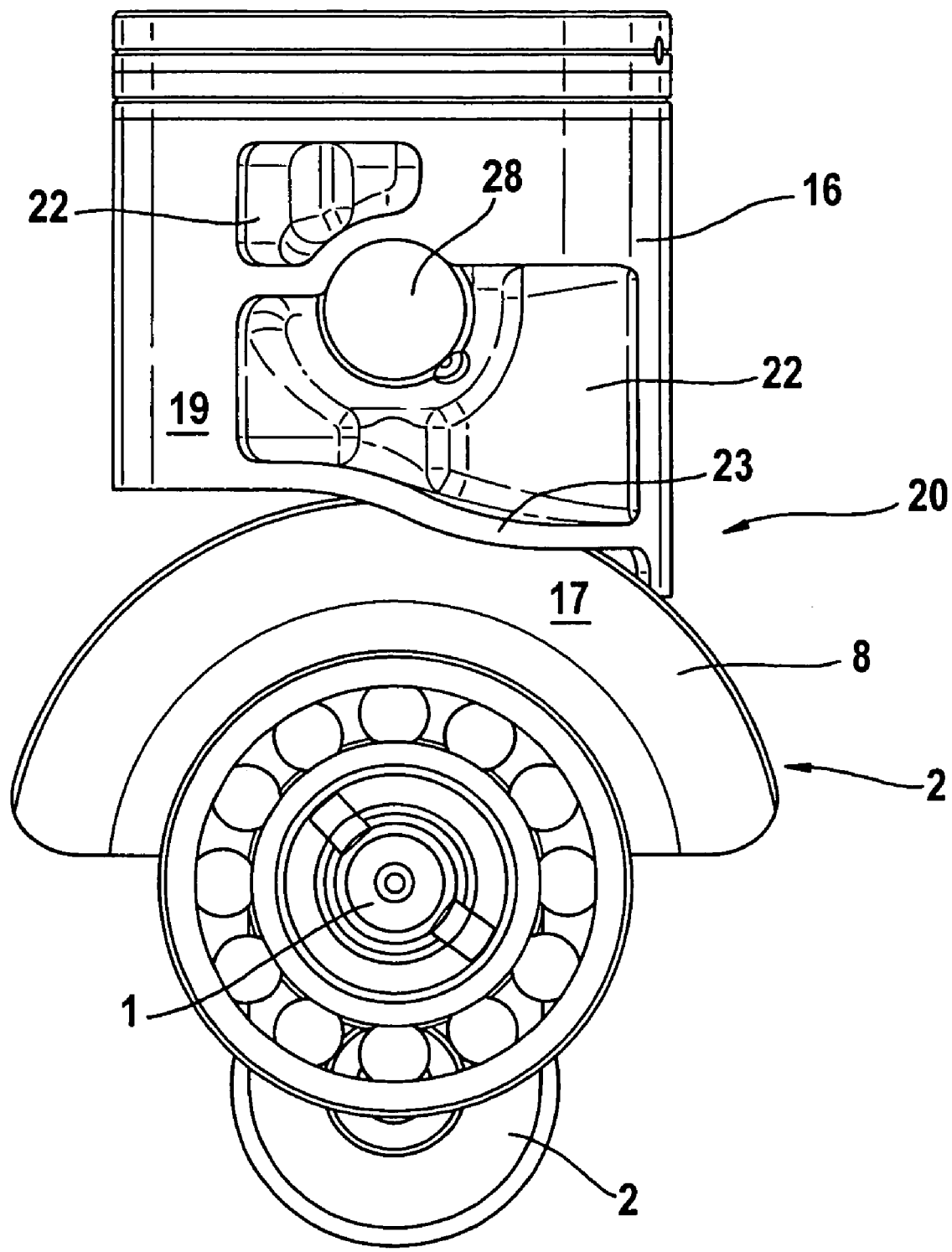
FIG. 3 is an end elevation view of the arrangement of FIGS. 1 and 2.

FIG. 3 shows an end elevation view of the arrangement of FIGS. 1 and 2. In FIG. 3, a piston pin 28 runs through the piston 16 in the axial direction 18 (FIG. 2) for journalling the connecting rod 7 (FIG. 2). Scavenging windows 22 are provided in the piston skirt 19 around the piston pin 28. Depending upon the angular position or piston position, an air channel (not shown) is cleared or closed via the scavenging windows 22. Substantially fuel-free air can be supplied via the air channel to a transfer channel (likewise not shown).

From FIG. 3, it can be seen that, at bottom dead center 20 shown, the region 23 of the piston skirt 19 is pulled down over the outer sides 17 of the centrifugal mass portions 8. The region 23 lies in the axial direction 18 (FIG. 2).

Figure 4:
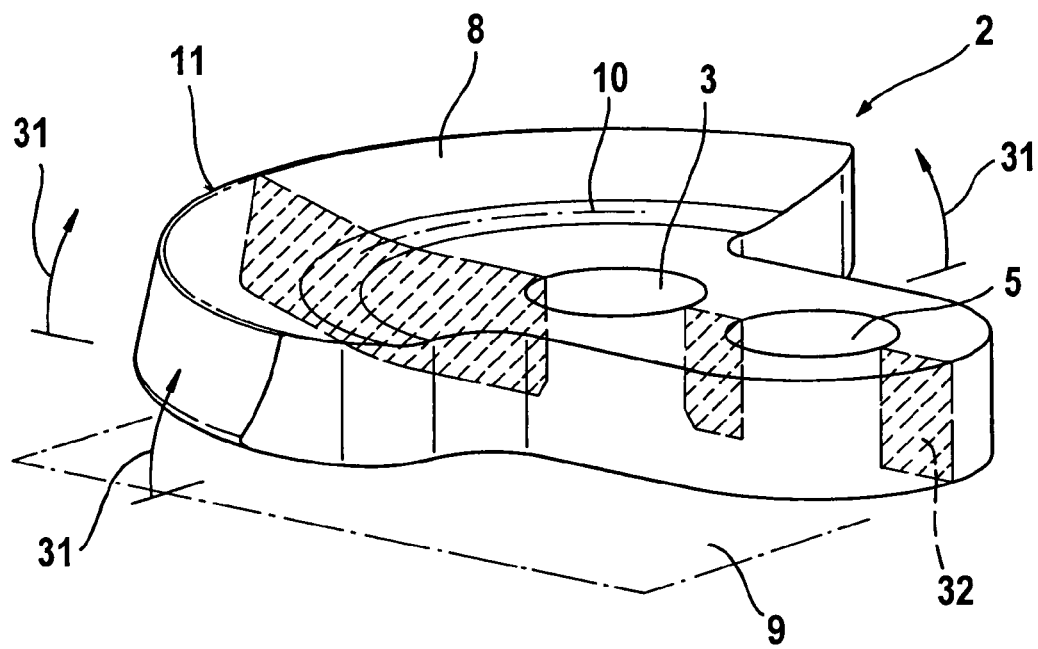
FIG. 4 is a perspective view which shows details of a crank arm of the crankshaft shown in FIGS. 1 to 3.

FIG. 4 shows a perspective view of a crank arm 2 included in FIGS. 1 to 3. The crank arm 2 has a mushroom-shaped contour and the region of the central cutout 3 and the eccentric cutout 5 lies in a plane 9. The mushroom-shaped centrifugal mass portion 8 is bent out of the plane 9 in the direction of arrows 31 to form a pan shape with the bending being along a bending line 10 running along a circular segment. The centrifugal mass portion 8 has a peripheral contour 11 in the form of a circular segment. The peripheral contour 11 and the bending line 10 are concentric to the central cutout 3.

The bent over cross-sectional form of the crank arm 2 is shown by the hatched section areas 32 in FIG. 4. These hatched surfaces 32 are shown in the cross-sectional view of the crank arm 2 in FIG. 5. The crank arm 2 has an essentially constant thickness D in the region of the centrifugal mass portion 8 as well as in the region of the cutouts (3, 5). The centrifugal mass portion 8 is bent over unguided and free in such a manner that its peripheral surface 33 is inclined to the rotational axis 30. As a consequence of the inclination of the peripheral surface 33, an outer edge 34 of the centrifugal mass portion 8 is formed which has an increased radial distance from the rotational axis 30.

Figure 5:
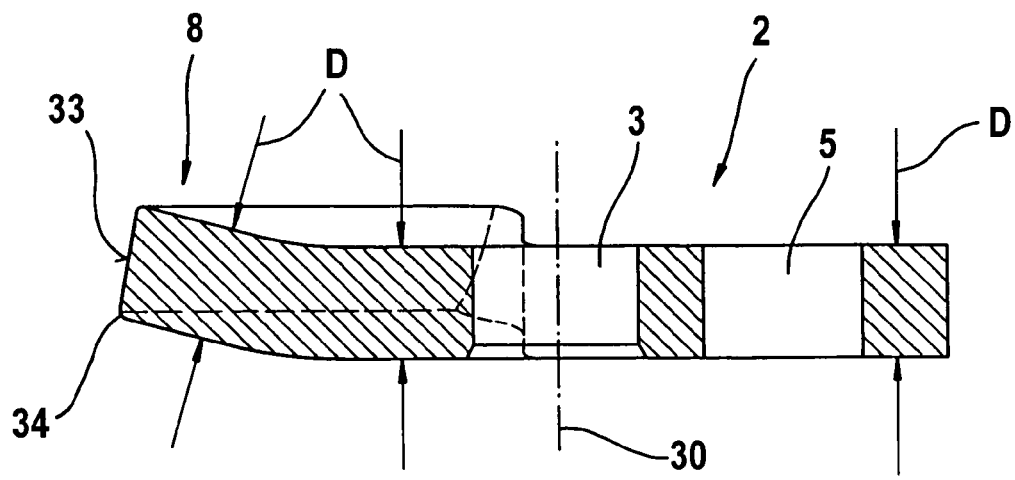
FIG. 5 is a side elevation view, in section, of the crank arm of FIG. 4.
Figure 6:
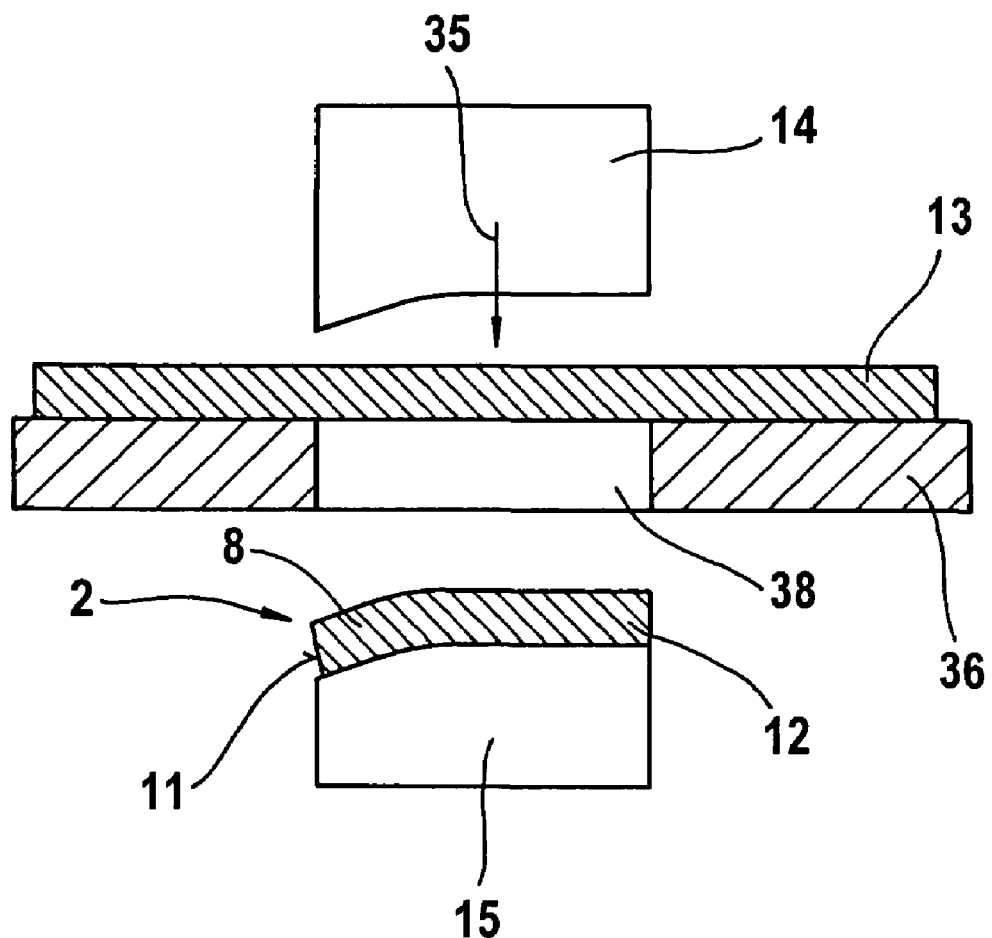
FIG. 6 is a schematic diagram of the method sequence for making the crank arm shown in FIGS. 4 and 5.

FIG. 6 shows a schematic of details of the method for making the crank arm 2 shown in FIGS. 4 and 5. A stamping swage 36 having a punch opening 38 is provided. A semifinished part 13 is placed on the stamping swage 36. For making the crank arm 2, a punch 14 is moved in the direction of the arrow 35. A blank 12 is separated from the semifinished part 13 by precision stamping because of the interaction of the punch 14 and the stamp swage 36. In the same work step, the blank 12 is then pressed against a bending swage 15 with the same punch 14. The centrifugal mass portion 8 is bent over in the form described above. The punch 14 and the bending swage 15 are configured in such a manner that the peripheral contour 11 of the centrifugal mass portion 8 is exposed and unguided during the bending operation. As a consequence, the inclined course of the peripheral surface 33 of FIG. 5 can adjust via at least approximately pure bending.

It is understood that the foregoing description is that of the preferred embodiments of the invention and that various changes and modifications may be made thereto without departing from the spirit and scope of the invention as defined in the appended claims.

What is claimed is:

1. A crankshaft assembly of an internal combustion engine, the crankshaft assembly comprising:
   a crankshaft having a journal lug;

a crank arm having a central cutout for receiving said journal lug therein;
a crank pin for journalling a connecting rod of said engine;
said crank arm being adjacent said connecting rod and having an eccentric cutout for journalling said crank pin therein;
said crank arm defining a plane and having an end portion lying opposite said eccentric cutout;
a centrifugal mass at said end portion of said crank arm and formed so as to be an integral part of said crank arm;
said crank arm being bent so as to cause said centrifugal mass to be bent out of said plane in a direction toward said connecting rod; and,
said crank arm having an essentially constant thickness (D) in the region of said centrifugal mass.

2. The crankshaft assembly of claim 1, wherein said centrifugal mass is bent out of said plane along a curved bending line so as to have a pan-shaped configuration.

3. The crankshaft assembly of claim 2, wherein said curved bending line corresponds to a segment of a circle.

4. The crankshaft assembly of claim 3, wherein said centrifugal mass has a peripheral contour in the form of a circular segment concentric to said bending line.

5. The crankshaft assembly of claim 1, wherein said engine is for a portable handheld work apparatus.

6. A method of making a crankshaft assembly of an internal combustion engine, the crankshaft assembly including: a crankshaft having a journal lug; a crank arm having a central cutout for receiving said journal lug therein; a crank pin for journalling a connecting rod of said engine; said crank arm being adjacent said connecting rod and having an eccentric cutout for journalling said crank pin therein; said crank arm defining a plane and having an end portion lying opposite said eccentric cutout; a centrifugal mass at said end portion of said crank arm and formed so as to be an integral part of said crank arm; the method comprising the steps of:
providing a semifinished piece;
precision punching said semifinished piece to produce a blank of said crank arm with said blank including said centrifugal mass formed integrally therewith to form a single piece; and,
bending said centrifugal mass out of said plane so as to cause said crank arm to have an essentially constant thickness (D) in the region of said centrifugal mass.

7. The method of claim 6, wherein said precision punching of said blank and said bending of said centrifugal mass are performed sequentially in one work operation with the same punch.

8. The method of claim 7, wherein said blank is pressed against a bending swage to bend over said centrifugal mass with said peripheral contour of said centrifugal mass lying free.

9. The method of claim 6, wherein said engine is for a portable handheld work apparatus.

10. An internal combustion engine comprising:
a crankshaft assembly;
a piston;
a connecting rod connected to said piston;
a crankshaft having a journal lug;
a crank arm having a central cutout for receiving said journal lug therein;
a crank pin for journalling said connecting rod;
said crank arm being adjacent said connecting rod and having an eccentric cutout for journalling said crank pin therein;
said crank arm defining a plane and having an end portion lying opposite said eccentric cutout;
a centrifugal mass at said end portion of said crank arm and formed so as to be an integral part of said crank arm;
said crank arm being bent so as to cause said centrifugal mass to be bent out of said plane in a direction toward said connecting rod; and,
said crank arm having an essentially constant thickness (D) in the region of said centrifugal mass.

11. The internal combustion engine of claim 10, wherein said centrifugal mass is bent out of said plane along a curved bending line so as to have a pan-shaped configuration.

12. The internal combustion engine of claim 11, wherein said curved bending line corresponds to a segment of a circle.

13. The internal combustion engine of claim 12, wherein said centrifugal mass has a peripheral contour in the form of a circular segment concentric to said bending line.

14. The internal combustion engine of claim 10, wherein said piston moves through a bottom dead center position in a stroke direction during the operation of said engine; and, said piston lies in at least partial overlapment with said centrifugal mass at said bottom dead center position.

15. The internal combustion engine of claim 14, wherein said crankshaft defines a crankshaft axis; said piston has a piston skirt defining a region within said skirt; said centrifugal mass has a side facing away from said connecting rod; and, said centrifugal mass is bent over so far in the direction of said crankshaft axis that said side thereof lies in said region and close to said skirt.

16. The internal combustion engine of claim 15, wherein said piston has at least one scavenging window in said skirt.

17. The internal combustion engine of claim 10, wherein said engine is for a portable handheld work apparatus.

18. The method of claim 6, wherein said centrifugal mass is bent out of said plane along a curved bending line so as to have a pan-shaped configuration.

19. The method of claim 6, wherein said curved bending line corresponds to a segment of a circle.

20. The internal combustion engine of claim 10, wherein said centrifugal mass is bent out of said plane along a curved bending line so as to have a pan-shaped configuration.

21. The internal combustion engine of claim 20, wherein said curved bending line corresponds to a segment of a circle.

* * * * *